(12) United States Patent
Ha et al.

(10) Patent No.: US 12,315,963 B2
(45) Date of Patent: May 27, 2025

(54) ELECTRONIC DEVICE AND METHOD OF PROTECTING BATTERY IN THE ELECTRONIC DEVICE

(71) Applicant: SAMSUNG ELECTRONICS CO., LTD., Suwon-si (KR)

(72) Inventors: Jaemu Ha, Suwon-si (KR); Hyunjun Oh, Suwon-si (KR); Minjeong Lee, Suwon-si (KR); Inhwan Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 17/872,274

(22) Filed: Jul. 25, 2022

(65) Prior Publication Data

US 2023/0131325 A1    Apr. 27, 2023

Related U.S. Application Data

(63) Continuation of application No. PCT/KR2022/009445, filed on Jun. 30, 2022.

(30) Foreign Application Priority Data

Oct. 22, 2021  (KR) .......................... 10-2021-0141700

(51) Int. Cl.
  *G06F 1/00*  (2006.01)
  *H01M 50/574*  (2021.01)
  (Continued)

(52) U.S. Cl.
  CPC .......... *H01M 50/574* (2021.01); *H02H 9/001* (2013.01); *H02J 7/0031* (2013.01); *H02J 7/0063* (2013.01)

(58) Field of Classification Search
  CPC .. H01M 50/574; H01M 10/425; H02H 9/001; H02H 7/18; H02J 7/0031; H02J 7/0063;
  (Continued)

(56) References Cited

U.S. PATENT DOCUMENTS 9,239,605 B1    1/2016  Nanda et al.
10,804,717 B1 *  10/2020  Gaide ................... H02J 7/0068
  (Continued)

FOREIGN PATENT DOCUMENTS

CN    205543135    8/2016
JP    H11-313024    11/1999
  (Continued)

OTHER PUBLICATIONS

Extended European Search Report dated Aug. 16, 2024 issued in European Patent Application No. 22883712.6.
  (Continued)

*Primary Examiner* — Xuxing Chen
(74) *Attorney, Agent, or Firm* — Nixon & Vanderhye, P.C.

(57) ABSTRACT

An electronic device according to various embodiments may include: a battery, a switch coupling the battery to a main board on which components of the electronic device are disposed, a power management module comprising power management circuitry including a function of powering on the electronic device at a power-on time set to power on the electronic device that is in a power-off state of the electronic device, and a processor. The processor may be configured to: upon identification of a power-off request for the electronic device, set the power-on time and power off the electronic device, based on the electronic device being powered on upon identification of the power-on time, compare a power-off period of the electronic device with a threshold period, and based on the power-off period of the electronic device
  (Continued)

being longer than a threshold period, decouple the battery from the main board by opening the switch.

20 Claims, 5 Drawing Sheets

(51) Int. Cl.
*H02H 9/00* (2006.01)
*H02J 7/00* (2006.01)

(58) Field of Classification Search
CPC ...... H02J 7/00306; G06F 1/26; G06F 1/3212; G06F 1/3287; G06F 1/266; G06F 1/28
See application file for complete search history.

(56) References Cited

U.S. PATENT DOCUMENTS

| | | |
|---|---|---|
| 2005/0010829 A1 | 1/2005 | Choi et al. |
| 2013/0187471 A1 | 7/2013 | Kim et al. |
| 2014/0068310 A1 | 3/2014 | Sultenfuss |
| 2018/0260019 A1* | 9/2018 | Kim .................... G06F 1/3287 |
| 2020/0099216 A1 | 3/2020 | Chen et al. |
| 2021/0210969 A1* | 7/2021 | Sun .................... H02J 7/00304 |
| 2021/0320513 A1 | 10/2021 | Kondo |

FOREIGN PATENT DOCUMENTS

| | | |
|---|---|---|
| JP | 2001-339867 | 12/2001 |
| JP | 2014-130735 | 7/2014 |
| KR | 10-1999-0070581 | 9/1999 |
| KR | 10-2000-0055762 | 9/2000 |
| KR | 10-0906247 | 7/2009 |
| KR | 10-0930701 | 12/2009 |
| KR | 10-2011-0112954 | 10/2011 |
| KR | 10-2012-0040396 | 4/2012 |
| KR | 10-2012-0134230 | 12/2012 |
| KR | 10-1510960 | 4/2015 |
| KR | 10-2268775 | 6/2021 |
| KR | 10-2564716 | 8/2023 |

OTHER PUBLICATIONS

Search Report and Written Opinion dated Sep. 29, 2022 issued in International Patent Application No. PCT/KR2022/009445.

* cited by examiner

ELECTRONIC DEVICE AND METHOD OF PROTECTING BATTERY IN THE ELECTRONIC DEVICE

CROSS-REFERENCE TO RELATED APPLICATIONS

This application is a continuation of International Application No. PCT/KR2022/009445 designating the United States, filed on Jun. 30, 2022, in the Korean Intellectual Property Receiving Office and claiming priority to Korean Patent Application No. 10-2021-0141700, filed on Oct. 22, 2021, in the Korean Intellectual Property Office, the disclosures of which are incorporated by reference herein in their entireties.

BACKGROUND

Field

The disclosure relates to a method of protecting a battery in an electronic device.

Description of Related Art

More and more services and additional functions are provided through an electronic device, for example, a portable electronic device such as a smartphone. In order to increase the utilization of such electronic devices and satisfy the needs of various users, communication service providers or electronic device manufacturers have competitively developed electronic devices to provide various functions and differentiate them from other companies. The use of various functions through an electronic device increases the battery consumption of the electronic device, and thus functions for protecting the performance of a battery are provided.

When the battery voltage of the electronic device reaches a power-off voltage while various functions are in use in the electronic device, or when power-off of the electronic device is selected by a user, the electronic device may be powered off. However, even after the power-off of the electronic device, the battery voltage of the electronic device may still decrease due to a minute current. Particularly when the electronic device is left in the off state for a long time, the battery of the electronic device may be completely discharged, which may cause a problem in the lifetime of the battery and swelling.

SUMMARY

According to various example embodiments, an electronic device may include: a battery, a switch coupling the battery to a main board on which components of the electronic device are disposed, a power management module comprising power management circuitry including a function of powering on the electronic device at a power-on time set to power on the electronic device in a power-off state of the electronic device, and a processor. The processor may be configured to: upon identification of a power-off request for the electronic device, set the power-on time and power off the electronic device, based on the electronic device being powered on upon identification of the power-on time, compare a power-off period of the electronic device with a threshold period, and based on the power-off period of the electronic device being longer than a threshold period, decouple the battery from the main board by opening the switch.

According to various example embodiments, a method of protecting a battery in an electronic device may include: upon identification of a power-off request for the electronic device, setting a power-on time to power on the electronic device in a power-off state of the electronic device, based on the power-on time being set, powering off the electronic device, based on the electronic device being powered on upon identification of the power-on time, comparing a power-off period of the electronic device with a threshold period, and based on the power-off period of the electronic device being longer than a threshold period, decoupling the battery from a main board on which components of the electronic device are disposed by opening a switch coupling the battery to the main board.

According to various example embodiments, even though an electronic device is kept in a power-off state for a long time, a battery of the electronic device may be protected.

Further, a function (e.g., a traffic card function using near field communication (NFC)) configured to be used even during power-off of the electronic device may be used at up to a predetermined voltage.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
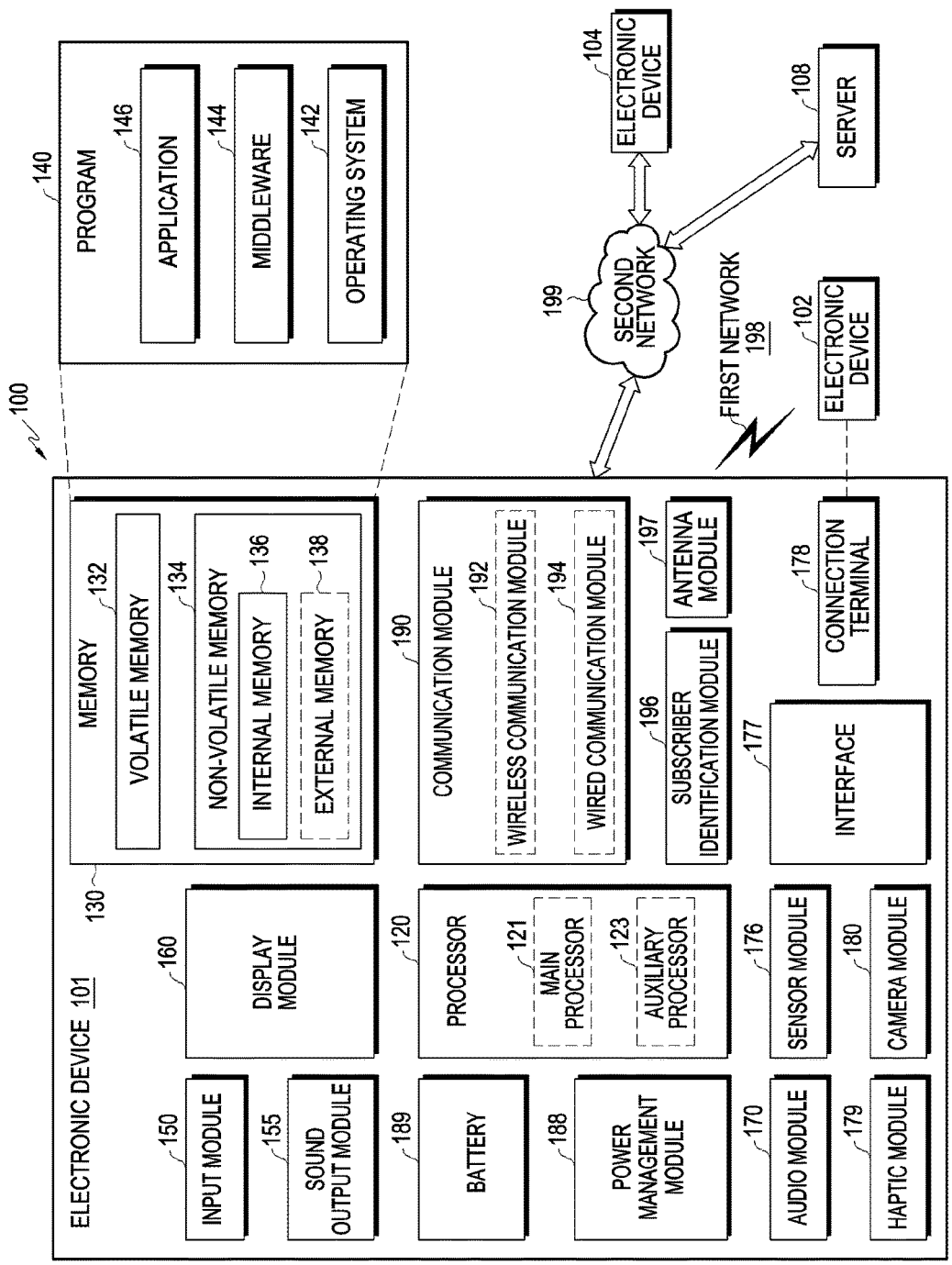
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
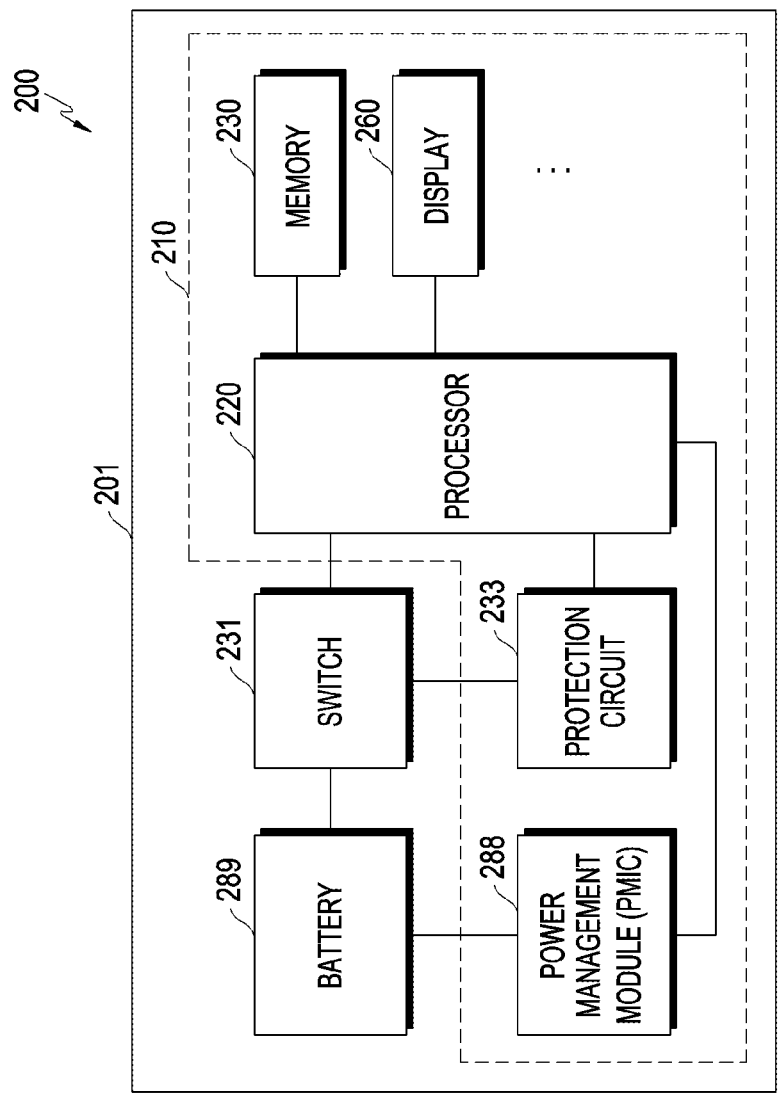
FIG. 2 is a block diagram illustrating an example configuration of an electronic device according to various embodiments.

FIG. 2 is a block diagram 200 illustrating an example configuration of an electronic device according to various embodiments.

Referring to FIG. 2, according to various embodiments, an electronic device 201 (e.g., the electronic device 101 of FIG. 1) may include a main board 210 on which components of the electronic device 201 are disposed, a battery 289 (e.g., the battery 189 of FIG. 1), and a switch 231 to couple or decouple the main board 210 to or from the battery 289, and the components of the electronic 201 disposed on the main board 210 may include a processor (e.g., including processing circuitry) 220, a power management module (e.g., including power management circuitry, e.g., a power management integrated circuit (PMIC)) 288, a protection circuit 233, memory 230, and a display 260. For example, at least one component may be disposed on the main board 210 and electrically coupled to the main board 210, or a connecting member (e.g., a flexible printed circuit board (FPCB)) may be disposed on the main board 210 to couple at least one component to the main board 210. For example, the processor 220 may be mounted on the main board 210 through conductive pins, and the display 260 may be electrically coupled to the main board 210 through the connecting member. It will be readily understood by those skilled in the art that a method of disposing components on the main board 210 is not limited. For example, the switch 231 coupling the main board 210 to the battery 289 may refer to a device configured to couple or decouple a current flow from the battery 289 to or from the main board 210. The type of the switch 231 may include, but is not limited to, single pole single throw (SPST) and/or single pole double throw (SPDT). The expression "the switch 231 couples the battery 289" used for convenience of description in various embodiments of the disclosure may refer, for example, to the switch 231 being closed, and thus an electrical path is connected between the battery 289 and the main board 210. The expression "the switch 231 decouples the battery 289" may refer, for example, to the switch 231 being open, and thus an electrical path is disconnected between the battery 289 and the main board 210.

According to various embodiments, when identifying a power-off request for the electronic device 201, the processor 220 may set a power-on time to power on the electronic device in the power-off state of the electronic device, and then power off the electronic device.

According to an embodiment, when identifying a user request or identifying a voltage of the battery 289 as a power-off voltage of the electronic device, the processor 220 may identify the user request or the power-off voltage as a power-off request for the electronic device 201. For example, when the processor 220 receives a user request through an input module (e.g., the input module 150 (power button) of FIG. 1) of the electronic device 201, or identifies the power-off voltage (e.g., less than 1% of a total voltage) of the battery 289 through the power management module 288, the processor 220 may identify the user request or the power-off voltage as a power-off request for the electronic device 201.

According to an embodiment, the processor 220 may identify a voltage of the battery 289. For example, the processor 220 may identify the voltage of the battery 289 through the power management module 288. The processor 220 may set a power-on time to power on the electronic device in the power-off state of the electronic device, based on the voltage of the battery 289.

According to an embodiment, the processor 220 may identify a voltage of the battery 289, detect a first time corresponding to the voltage of the battery 289 in the memory 230, and set the detected first time as a time (hereinafter, referred to as a "power-on time") to power on the electronic device in the power-off state. For example, when battery voltage values are divided into a first threshold range, a second threshold range, and a third threshold range in descending order, and the first threshold range, the second threshold range, and the third threshold range are stored mapped to a first time (e.g., one week), a second time (e.g., three days), and a third time (e.g., one day) as a power-on time, respectively in the memory 230, the processor 220 may set the first time as the power-on time when the voltage of the battery 289 falls within the first threshold range. For example, at least one threshold range stored in the memory 230 and at least one power-on time mapped to the at least one threshold range may be stored in the memory 230 at a time of development or manufacturing of the electronic device 201 or updated through a server (e.g., the server 108 of FIG. 1).

According to an embodiment, the processor 220 may identify a voltage of the battery 289 and set a power-on time based on the voltage of the battery 289 and a model type of the electronic device. For example, when battery voltage values are divided into the first threshold range, the second threshold range, and the third threshold range in the descending order, and the first threshold range, the second threshold range, and the third threshold range are stored mapped to the first time (e.g., one week), the second time (e.g., three days), and the third time (e.g., one day) as a power-on time, respectively in the memory 230, the first threshold range, the second threshold range, and the third threshold range may be stored differently depending on the model type of the electronic device. For example, the model type of the electronic device 201 may include, but not limited to, at least one of a model number of the electronic device 201, a capacity of the battery 289 included in the electronic device 201, a model number of the battery 289, and/or a model number of the power management module 288 included in the electronic device 201.

According to an embodiment, when the first time is set as the power-on time, the processor 220 may transmit the set first time as information about the power-on time to the power management module 288, and then power off the electronic device 201. For example, the power management module 288 may include separate memory and store the information about the power-on time received from the processor 220 in the separate memory. The power management module 288 may access a specified partial area (e.g., an address area) of the memory 230 included in the electronic device 201. In this case, transmitting the information about the power-on time to the PMIC 288 by the processor 220 may include storing the information about the power-on time in the specified area. In addition, it should be noted that any method in which the processor 220 may share the power-on time with the power management module 288 may be applied adaptively to various embodiments of the disclosure.

According to various embodiments, when the electronic device is powered on according to the identification of the power-on time to power on the electronic device, the processor 220 may determine whether to decouple the battery 289 from the main board 210 based on a power-off period of the electronic device.

According to an embodiment, upon receipt of first information indicating power-on of the electronic device by the power management module 288 from the power management module 288 which has powered on the electronic device at the first time set as the power-on time from the power management module 288, the processor 220 may activate and operate only some components required to determine whether to decouple the battery 289 from the main board 210 among the components of the electronic device disposed on the main board 210. For example, because a time period from the power-on of the electronic device according to the first time to power-off of the electronic device according to decoupling between the battery 289 and the main board 210 is too short to be recognizable to the user, only some components required to determine whether to decouple the battery 289 from the main board 210, except for the display 260 among the components of the electronic device disposed on the main board 210 may be activated and operated.

According to an embodiment, upon receipt of the first information indicating power-on of the electronic device by the power management module 288 from the power management module 288 which has powered on the electronic device at the first time set as the power-on time from the power management module 288, the processor 220 may compare a power-off period of the electronic device with a threshold period.

According to an embodiment, the power-off period of the electronic device may refer to a period from a time when the electronic device is initially powered off according to the user request or the voltage of the battery 289 identified as the power-off voltage of the electronic device to a time when the electronic device is powered on according to the first time set as the power-on time.

According to an embodiment, the processor 220 may set the threshold period for comparison with the power-off period of the electronic device based on a voltage of the battery 289.

According to an embodiment, the processor 220 may detect the threshold period in the memory 230 based on the voltage of the battery 289 and set the threshold period. For example, when battery voltage values are divided into the first threshold range, the second threshold range, and the third threshold range in the descending order, and the first threshold range, the second threshold range, and the third threshold range are stored mapped to a first period (e.g., one month), a second period (e.g., 15 days), and a third period (e.g., 10 days) as a threshold period in the memory 230, the processor 220 may set the threshold period to the first period (e.g., one month) when the voltage of the battery falls within the first threshold range.

According to an embodiment, when the power-off period of the electronic device is longer than the first period set as the threshold period as a result of the comparison between the power-off period of the electronic device and the first period set as the threshold period, the processor 220 may decouple the battery 289 from the main board 210 by opening the switch 231, so that power is cut off from the components of the electronic device disposed on the main board 210 and the electronic device is powered off.

According to an embodiment, when the power-off period of the electronic device is longer than the first period set as the threshold period as a result of the comparison between the power-off period of the electronic device and the first period set as the threshold period, the processor 220 may open the switch 231 by controlling the protection circuit 233.

According to an embodiment, when power is supplied to the electronic device 201 through a connection to an external charger in the state in which the switch 231 is open and thus the battery 289 is decoupled from the main board 210, the processor 220 may couple the battery 289 to the main board 210 through connection of the switch 231 and supply power to the main board 210 using the voltage of the battery 289.

According to an embodiment, when the power-off period of the electronic device is equal to or shorter than the first period set as the threshold period as a result of the comparison between the power-off period of the electronic device and the first period set as the threshold period, the processor 220 may identify a voltage of the battery 289 and maintain or reset the power-on time to power on the electronic device in the power-off state of the electronic device, based on the voltage of the battery 289. Because the voltage of the battery 289 may be changed by performing the operation of powering on the electronic device at the first time set as the power-on time by the power management module 288 and comparing the power-off period of the electronic device with the threshold period, the processor 220 may identify the voltage of the battery before powering off the electronic device. When the voltage of the battery falls within the first threshold range, the processor 220 may maintain the power-on time to be the first time, and when the voltage of the battery falls within the second threshold range or the third threshold range, the processor 220 may reset the power-on time to the second time or the third time. The processor 220 may transmit information about the power-on time set as the first time, information about the power-on time set as the second time, or information about the power-on time set as the third time to the power management module 288, and then power off the electronic device.

According to an embodiment, in the case where the threshold period is set to the second time, upon receipt of first information indicating power-on of the electronic device by the power management module 288 from the power management module 288 which has powered on the electronic device at the second time set as the power-on time from the power management module 288, the processor 220 may compare a power-off period of the electronic device and with a threshold period.

According to an embodiment, because the voltage of the battery 289 may be changed by performing the operation of powering on the electronic device at the first time set as the power-on time by the power management module 288 and comparing the power-off period of the electronic device with the threshold period, the processor 220 may identify the voltage of the battery before powering off the electronic device. When the voltage of the battery falls within the first threshold range, the processor 220 may maintain the threshold period to be the first period, and when the voltage of the battery falls within the second threshold range or the third threshold range, the processor 220 may reset the threshold period to the second period or the third period.

According to an embodiment, when the threshold period is reset to the second period, the processor 220 may compare the power-off period of the electronic device with the second period set as the threshold period. When the power-off period of the electronic device is longer than the second period set as the threshold period as a result of the comparison, the processor 220 may decouple the battery 289 from the main board 210 by opening the switch 231, so that power is cut off from the components of the electronic device disposed on the main board 210 and the electronic device is powered off. When the power-off period of the electronic device is equal to or shorter than the second period set as the threshold period as a result of the comparison, the processor 220 may maintain or reset the power-on time based on the voltage of the battery 289 and then power off the electronic device.

According to various embodiments, when the electronic device is powered on according to identification of the power-on time to power on the electronic device, while the electronic device is off, the processor 220 may determine whether to decouple the battery 289 from the main board 210 based on the voltage of the battery.

According to an embodiment, upon receipt of the first information indicating power-on of the electronic device by the power management module 288 from the power management module 288 which has powered on the electronic device at the first time set as the power-on time from the power management module 288, the processor 220 may compare the power-off period of the electronic device with the threshold period. When the power off period of the electronic is equal to or shorter than the threshold period as a result of the comparison, the processor 220 may compare the voltage of the battery 289 with a threshold value.

According to an embodiment, in the case where the power off period of the electronic is equal to or shorter than the threshold period, when the voltage of the battery 289 is less than the threshold value, the processor 220 may decouple the battery 289 from the main board 210 by opening the switch 231, so that power is cut off from the components of the electronic device disposed on the main board, and the electronic device is powered off.

According to an embodiment, in the case where the power off period of the electronic is equal to or shorter than the threshold period, when the voltage of the battery 289 is equal to or larger than the threshold value, the processor 220 may maintain or reset the power-on time based on the voltage of the battery 289 and then power off the electronic device.

According to various embodiments, when the electronic device is powered on according to identification of the power-on time to power on the electronic device, while the electronic device is off, the processor 220 may determine whether to decouple the battery 289 from the main board 210 based on the voltage of the battery.

According to an embodiment, upon receipt of the first information indicating power-on of the electronic device by the power management module 288 from the power management module 288 which has powered on the electronic device at the first time set as the power-on time from the power management module 288, the processor 220 may compare the voltage of the battery 289 with the threshold value.

According to an embodiment, when the voltage of the battery 289 is less than the threshold value, the processor 220 may decouple the battery 289 from the main board 210 by opening the switch 231, so that power is cut off from the components of the electronic device disposed on the main board, and the electronic device is powered off.

According to an embodiment, when the voltage of the battery 289 is equal to or larger than the threshold value, the processor 220 may maintain or reset the power-on time based on the voltage of the battery 289 and then power off the electronic device.

According to various embodiments, the power management module 288 (e.g., the power management module 188 of FIG. 1) may be implemented, for example, as at least part of a power management integrated circuit (PMIC).

According to an embodiment, the power management module 288 may be coupled to the battery 289 and the processor 220. The power management module 288 may periodically or aperiodically monitor a state of the battery 289, report the state (e.g., voltage, current, a discharge state, and a charging state) of the battery 289 to the processor 220, and receive information (e.g., a power-on time and a power control signal) related to the battery 289 from the processor 220.

According to an embodiment, when the power management module 288 receives information about a power-on time to power on the electronic device in the power-off state of the electronic device from the processor 220, the power management module 288 may set a notification function to power on the electronic device at the power-n time.

According to an embodiment, when identifying that the power-on time has arrived, the power management module 288 may power on the electronic device and transmit first information indicating that it has powered on the electronic device at the power-on time to the processor 220.

According to various embodiments, the protection circuit 233 may couple or decouple the battery 289 to or from the main board 210 on which the components of the electronic device are disposed by controlling to open or close (turn on or off) the switch under the control of the processor 220.

According to various embodiments, the memory 230 may be implemented substantially the same as or similar to the memory 130 of FIG. 1.

According to an embodiment, the memory 230 may store information about a plurality of threshold ranges (e.g., the first threshold range, the second threshold range, and the third threshold range) based on which a power-on time may be detected according to the voltage of the battery 289.

According to an embodiment, the memory 230 may store information about a plurality of threshold ranges (e.g., the first threshold range, the second threshold range, and the third threshold range) based on which a threshold period to be compared with the power-off period of the electronic device may be detected according to the voltage of the battery 289.

According to various embodiments, the display 260 may be implemented substantially the same as or similar to the display module 160 of FIG. 1.

According to an embodiment, the display 260 may display an input module (e.g., the input module 150 (power button) of FIG. 1) to receive a user input for powering off the electronic device.

According to an embodiment, the display 260 may be maintained in the off state, while the electronic device is powered on to decouple the battery 289 from the main board 210 in the power-off state of the electronic device, and then powered off.

According to various example embodiments, an electronic device (e.g., the electronic device 201 of FIG. 2) may include: a battery (e.g., the battery 289 of FIG. 2), a switch (e.g., the switch 231 of FIG. 2) coupling the battery to a main board on which components of the electronic device are disposed, a power management module (e.g., the power management module 288 of FIG. 2) comprising power management circuitry including a function of powering on the electronic device at a power-on time set to power on the electronic device in a power-off state of the electronic device, and a processor (e.g., the processor 220 of FIG. 2). The processor may be configured to: upon identification of a power-off request for the electronic device, set the power-on time and power off the electronic device, based on the electronic device being powered on upon identification of the power-on time, compare a power-off period of the electronic device with a threshold period, and based on the power-off period of the electronic device being longer than a threshold period, decouple the battery from the main board by opening the switch.

According to various example embodiments, the processor may be configured to: upon the identification of the power-off request for the electronic device, identify a voltage of the battery and set the power-on time to a first time based on the voltage of the battery.

According to various example embodiments, the processor may be configured to power off the electronic device, after transmitting information about the set power-on time to the power management module.

According to various example embodiments, the processor may be configured to: compare the power-off period with the threshold period, upon receipt of first information indicating power-on of the electronic device by the power management module which has powered on the electronic device at the first time set as the power-on time of the electronic device, from the power management module.

According to various example embodiments, the power-off period of the electronic device may be a time period from a time at which the electronic device is initially powered off to a time at which the electronic device is powered on at the power-on time.

According to various example embodiments, the processor may be configured to set the threshold period based on the voltage of the battery, based on the electronic device being powered on, upon identification of the power-on time.

According to various example embodiments, the processor may be configured to power off the electronic device based on maintaining the power-on time to be the first time or resetting the power-on time to a second time, based on the power-off period of the electronic device being equal to or shorter than the threshold period.

According to various example embodiments, the processor may be configured to, based on the power-off period of the electronic device being equal to or shorter than the threshold period, compare the voltage of the battery with a threshold value, and based on the voltage of the battery being less than the threshold value, decouple the battery from the main board by opening the switch.

According to various example embodiments, the processor may be configured to, based on the battery voltage being equal to or greater than the threshold, power off the electronic device based on maintaining the power-on time to be the first time or resetting the power-on time to a second time based on the voltage of the battery.

According to various example embodiments, the electronic device may further include a protection circuit (e.g., the protection circuit 233 of FIG. 2), and the processor may be configured to control the protection circuit to open or close the switch.

Figure 3:
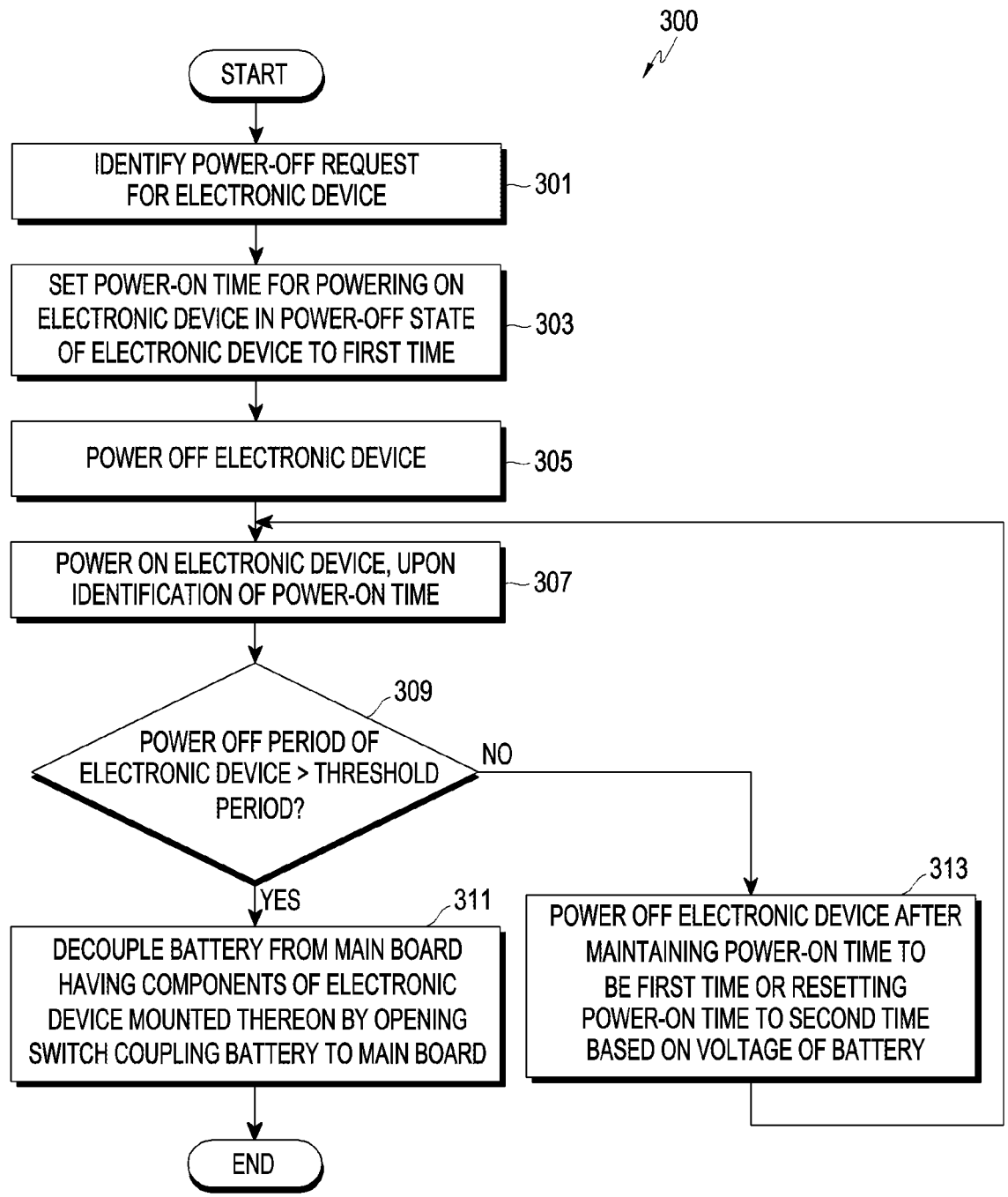
FIG. 3 is a flowchart illustrating an example operation of performing a battery protection function in an electronic device according to various embodiments.

FIG. 3 is a flowchart 300 illustrating an example operation of performing a battery protection function in an electronic device according to various embodiments. The operation of performing the battery protection function may include operations 301 to 313. According to an embodiment, at least one of operations 301 to 313 may be skipped, the order of some operations may be changed, or another operation may be added. Operations 301 to 313 may be performed, for example, in an electronic device (e.g., the electronic device 101 of FIG. 1, a component of the electronic device 101 of FIG. 1 (e.g., the processor of FIG. 1), the electronic device 201 of FIG. 2, or a component of the electronic device 201 of FIG. 2 (e.g., the processor 220 of FIG. 2)).

In operation 301, the electronic device (e.g., the electronic device 101 of FIG. 1 or the electronic device 201 of FIG. 2) may identify a power-off request for the electronic device.

According to an embodiment, when identifying a user request or identifying the voltage of a battery (e.g., the battery 289 of FIG. 2) as a power-off voltage of the electronic device, the electronic device may identify the user request or the power-off voltage as the power-off request for the electronic device.

In operation 303, the electronic device (e.g., the electronic device 101 of FIG. 1 or the electronic device 201 of FIG. 2) may set a power-on time to power on the electronic device that is in a power-off state of the electronic device to a first time.

According to an embodiment, the electronic device may identify a voltage of the battery (e.g., the battery 289 of FIG. 2), and set the power-on time to power on the electronic device in the power-off state of the electronic device, based on the voltage of the battery.

According to an embodiment, the electronic device may identify the voltage of the battery, detect the first time corresponding to the voltage of the battery in memory (e.g., the memory 230 of FIG. 2), and set the detected first time as the power-on time to power on the electronic device in the power-off state of the electronic device. For example, when battery voltage values are divided into a first threshold range, a second threshold range, and a third threshold range in descending order, and the first threshold range, the second threshold range, and the third threshold range are stored mapped to a first time (e.g., one week), a second time (e.g., three days), and a third time (e.g., one day) as a power-on time, respectively in the memory, the electronic device may set the first time as the power-on time, when the voltage of the battery falls within the first threshold range.

According to an embodiment, the electronic device may identify the voltage of the battery, and set the power-on time based on the voltage of the battery and a model type of the electronic device. For example, when battery voltage values are divided into a first threshold range, a second threshold range, and a third threshold range in descending order, and the first threshold range, the second threshold range, and the third threshold range are stored mapped to a first time (e.g., one week), a second time (e.g., three days), and a third time (e.g., one day) as a power-on time, respectively in the memory, the first threshold range, the second threshold range, and the third threshold range may be stored differently according to the model type of the electronic device.

In operation 305, the electronic device (e.g., the first electronic device 101 of FIG. 1 or the electronic device 201 of FIG. 2) may power itself off.

According to an embodiment, when the power-on time is set to the first time, the electronic device may transmit the set first time as information about the power-on time to a power management module (e.g., the power management module 288) and then power off itself.

In operation 307, upon identification of the power-on time, the electronic device (e.g., the electronic device 101 of FIG. 1 or the electronic device 201 of FIG. 2) may power itself on.

According to an embodiment, in the case where the power-on time is set to the first time, upon receipt of first information indicating power-on of the electronic device by the power management module (e.g., the power management module 288 of FIG. 2) from the power management module which has powered on the electronic device at the first time set as the power-on time from the power management module (e.g., the power management module 288 of FIG. 2), the electronic device may activate and operate only some components required to determine whether to decouple the battery (e.g., the battery 289 of FIG. 2) from a main board (e.g., the main board 210 of FIG. 2) among components of the electronic device disposed on the main board (e.g., the main board 210 of FIG. 2).

In operation 309, the electronic device (e.g., the electronic device 101 of FIG. 1 or the electronic device 201 of FIG. 2) may compare a power-off period of the electronic device with a threshold period.

According to an embodiment, upon receipt of the first information indicating power-on of the electronic device by the power management module (e.g., the power management module 288 of FIG. 2) from the power management module which has powered on the electronic device at the first time set as the power-on time from the power management module (e.g., the power management module 288 of FIG. 2), the electronic device may compare the power-off period of the electronic device with the threshold period.

According to an embodiment, the power-off period of the electronic device may refer to a time period from a time when the electronic device is initially powered off according to the user request or the voltage of the battery 289 identified as the power-off voltage of the electronic device to a time when the electronic device is powered on according to the first time set as the power-on time.

According to an embodiment, the electronic device may set the threshold period for comparison with the power-off period of the electronic device based on the voltage of the battery.

According to an embodiment, the electronic device may detect the threshold period in the memory (e.g., the memory 230 of FIG.) based on the voltage of the battery, and set the detected threshold period. For example, when battery voltage values are divided into a first threshold range, a second threshold range, and a third threshold range in descending order, and the first threshold range, the second threshold range, and the third threshold range are stored mapped to a first period (e.g., one month), a second period (e.g., 15 days), and a third period (e.g., 10 days), respectively in the memory, the electronic device may set the threshold period to the first period (e.g., one month), when the battery voltage falls within the first threshold range.

When the electronic device (e.g., the electronic device 101 of FIG. 1 or the electronic device 201 of FIG. 2) identifies that the power-off period of the electronic device is longer than the threshold period in operation 309 (operation 309—YES), the electronic device (e.g., the electronic device 101 of FIG. 1 or the electronic device 201 of FIG. 2) may decouple the battery (e.g., the battery 289 of FIG. 2) from the main board (e.g., the main board 210) on which the components of the electronic device are disposed by opening a switch (e.g., the switch 231 of FIG. 2) coupling the battery (e.g., the battery 289 of FIG. 2) to the main board (e.g., the main board 210 of FIG. 2) in operation 311.

According to an embodiment, when the power-off period of the electronic device is longer than the first period set as the threshold period as a result of comparing the power-off period of the electronic device with the first period set as the threshold period, the electronic device may decouple the battery from the main board by opening the switch, thereby cutting off power from the components of the electronic device disposed on the main board and powering off itself.

According to an embodiment, when the power-off period of the electronic device is longer than the first period set as the threshold period as a result of comparing the power-off period of the electronic device with the first period set as the threshold period, the electronic device may open the switch by controlling a protection circuit (e.g., the protection circuit 233 of FIG. 2).

When the electronic device (e.g., the electronic device 101 of FIG. 1 or the electronic device 201 of FIG. 2) identifies that the power-off period of the electronic device is equal to or shorter than the threshold period (operation 309—NO)), the electronic device (e.g., the electronic device 101 of FIG. 1 or the electronic device 201 of FIG. 2) may power off itself after maintaining the power-on time to be the first time or resetting the power-on time to the second time based on the voltage of the battery (e.g., the battery 289 of FIG. 2) in operation 313.

According to an embodiment, when the power-off period of the electronic device is equal to or shorter than the first period set as the threshold period as a result of comparing the power-off period of the electronic device with the first period set as the threshold period, the electronic device may identify a voltage of the battery and maintain or reset the power-on time to power on the electronic device in the power-off state of the electronic device, based on the voltage of the battery.

According to an embodiment, when the identified voltage of the battery falls within the first threshold range, the electronic device may maintain the power-on time to be the first time. When the identified voltage of the battery falls within the second threshold range or the third threshold range, the electronic device may reset the power-on time to the second time or the third time.

According to an embodiment, after transmitting information about the power-on time set to the first time or information about the power-on time reset to the second time or the third time to the power management module (e.g., the power management module 288 of FIG. 2), the electronic device may power off itself.

In the case where the power-on time is set to the second time, upon receipt of first information indicating power-on of the electronic device by the power management module (e.g., the power management module 288 of FIG. 2) from the power management module which has powered on the electronic device at the second time set as the power-on time from the power management module (e.g., the power management module 288 of FIG. 2), the electronic device may compare a power-off period of the electronic device with a threshold period in operations 307 and 309.

According to an embodiment, because the voltage of the battery (e.g., the battery 289 of FIG. 2) may be changed by performing the operation of powering on the electronic device at the previous first time set as the power-on time by the power management module and comparing the power-off period of the electronic device with the threshold period, the electronic device may identify a voltage of the battery. When the identified voltage of the battery falls within the first threshold range, the electronic device may maintain the threshold period to be the first period. When the identified voltage of the battery falls within the second threshold range or the third threshold range, the electronic device may reset the threshold period to the second period or the third period.

According to an embodiment, when the threshold period is reset to the second period, the electronic device may compare the power-off period of the electronic device with the second period set as the threshold period.

When the electronic device (e.g., the electronic device 101 of FIG. 1 or the electronic device 201 of FIG. 2) identifies that the power-off period of the electronic device is longer than the second period set as the threshold period (operation 309—YES) in operation 309, the electronic device (e.g., the electronic device 101 of FIG. 1 or the electronic device 201 of FIG. 2) may decouple the battery (e.g., the battery 189 of FIG. 2) from the main board (e.g., the main board 210 of FIG. 2) by opening the switch (e.g., the switch 231 of FIG. 2), thereby cutting off power from the components of the electronic device disposed on the main board and powering off itself in operation 311.

When the electronic device (e.g., the electronic device 101 of FIG. 1 or the electronic device 201 of FIG. 2) identifies that the power-off period of the electronic device is equal to or shorter than the threshold period (operation 309—NO) in operation 309, the electronic device (e.g., the electronic device 101 of FIG. 1 or the electronic device 201 of FIG. 2) may power off itself after maintaining or resetting the power-on time based on the voltage of the battery (e.g., the battery 289 of FIG. 2) in operation 313.

Figure 4:
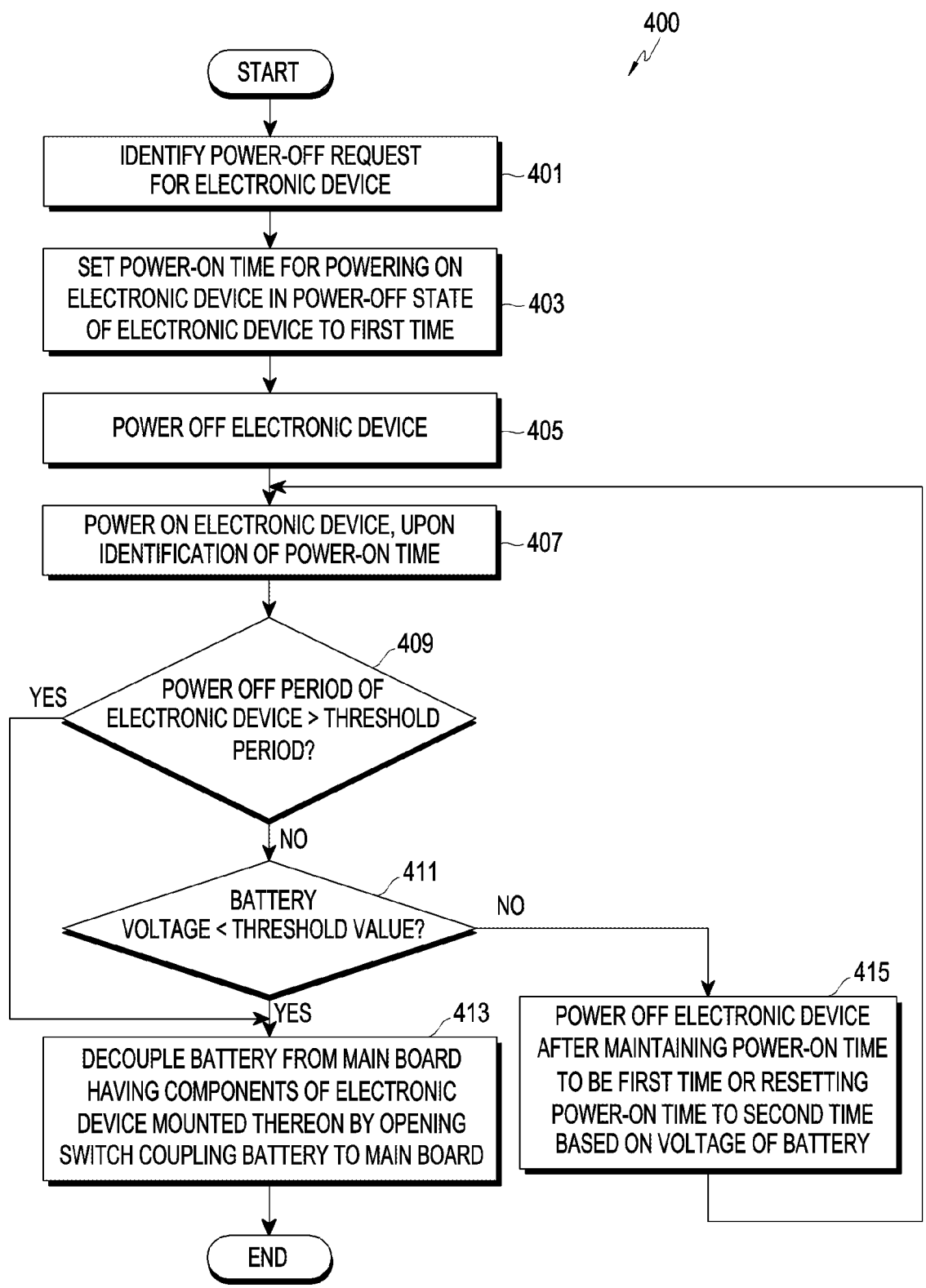
FIG. 4 is a flowchart illustrating an example operation of performing a battery protection function in an electronic device according to various embodiments.

FIG. 4 is a flowchart 400 illustrating an example operation of performing a battery protection function in an electronic device according to various embodiments. The operation of performing the battery protection function may include operations 401 to 415. According to an embodiment, at least one of operations 401 to 415 may be skipped, the order of some operations may be changed, or another operation may be added. Operations 401 to 415 may be performed, for example, in an electronic device (e.g., the electronic device 101 of FIG. 1, a component of the electronic device 101 of FIG. 1 (e.g., the processor of FIG. 1), the electronic device 201 of FIG. 2, or a component of the electronic device 201 of FIG. 2 (e.g., the processor 220 of FIG. 2)).

In operation 401, the electronic device (e.g., the electronic device 101 of FIG. 1 or the electronic device 201 of FIG. 2) may identify a power-off request for the electronic device.

According to an embodiment, when identifying a user request or identifying a voltage of a battery (e.g., the battery 289 of FIG. 2) as a power-off voltage of the electronic device, the electronic device may identify the user request or the power-off voltage as the power-off request for the electronic device.

In operation 403, the electronic device (e.g., the electronic device 101 of FIG. 1 or the electronic device 201 of FIG. 2) may set a power-on time to power on the electronic device in a power-off state of the electronic device to a first time.

According to an embodiment, the electronic device may identify the voltage of the battery (e.g., the battery 289 of FIG. 2), and set the power-on time to power on the electronic device that is in the power-off state of the electronic device, based on the voltage of the battery.

According to an embodiment, the electronic device may identify the voltage of the battery, detect the first time corresponding to the voltage of the battery in memory (e.g., the memory 230 of FIG. 2), and set the detected first time as a power-on time to power on the electronic device in the power-off state. For example, when battery voltage values are divided into a first threshold range, a second threshold range, and a third threshold range in descending order, and the first threshold range, the second threshold range, and the third threshold range are stored mapped to a first time (e.g., one week), a second time (e.g., three days), and a third time (e.g., one day) as a power-on time, respectively in the memory, the electronic device may set the first time as the power-on time, when the voltage of the battery falls within the first threshold range.

According to an embodiment, the electronic device may identify a voltage of the battery, and set the power-on time based on the voltage of the battery and a model type of the electronic device. For example, when the battery voltage values are divided into a first threshold range, a second threshold range, and a third threshold range in the descending order, and the first threshold range, the second threshold range, and the third threshold range are stored mapped to a first time (e.g., one week), a second time (e.g., three days), and a third time (e.g., one day) as a power-on time, respectively in the memory, the first threshold range, the second threshold range, and the third threshold range may be stored differently depending on the model type of the electronic device.

In operation 405, the electronic device (e.g., the first electronic device 101 of FIG. 1 or the electronic device 201 of FIG. 2) may power itself off.

According to an embodiment, when the power-on time is set to the first time, the electronic device may transmit the set first time as information about the power-on time to a power management module (e.g., the power management module 288) and then power off itself.

In operation 407, upon identification of the power-on time, the electronic device (e.g., the electronic device 101 of FIG. 1 or the electronic device 201 of FIG. 2) may power itself on.

According to an embodiment, in the case where the power-on time is set to the first time, upon receipt of first information indicating power-on of the electronic device by the power management module (e.g., the power management module 288 of FIG. 2) from the power management module which has powered on the electronic device at the first time set as the power-on time from the power management module (e.g., the power management module 288 of FIG. 2), the electronic device may activate and operate only some components required to determine whether to decouple the battery (e.g., the battery 289 of FIG. 2) from a main board (e.g., the main board 210 of FIG. 2) among components of the electronic device disposed on the main board (e.g., the main board 210 of FIG. 2).

In operation 409, the electronic device (e.g., the electronic device 101 of FIG. 1 or the electronic device 201 of FIG. 2) may compare a power-off period of the electronic device with a threshold period.

According to an embodiment, upon receipt of the first information indicating power-on of the electronic device by the power management module (e.g., the power management module 288 of FIG. 2) from the power management module which has powered on the electronic device at the first time set as the power-on time from the power management module, the electronic device may compare the power-off period of the electronic device with the threshold period.

According to an embodiment, the power-off period of the electronic device may refer to a time period from a time when the electronic device is initially powered off according to the user request or the voltage of the battery 289 identified as the power-off voltage of the electronic device to a time when the electronic device is powered on according to the first time set as the power-on time.

According to an embodiment, the electronic device may set the threshold period for comparison with the power-off period of the electronic device based on the voltage of the battery.

According to an embodiment, the electronic device may detect the threshold period in the memory (e.g., the memory 230 of FIG.) based on the voltage of the battery, and set the detected threshold period. For example, when battery voltage values are divided into a first threshold range, a second threshold range, and a third threshold range in the descending order, and the first threshold range, the second threshold range, and the third threshold range are stored mapped to a first period (e.g., one month), a second period (e.g., 15 days), and a third period (e.g., 10 days), respectively in the memory, the electronic device may set the threshold period to the first period (e.g., one month), when the battery voltage falls within the first threshold range.

When the electronic device (e.g., the electronic device 101 of FIG. 1 or the electronic device 201 of FIG. 2) identifies that the power-off period of the electronic device is equal to or shorter than the threshold period (operation 409—NO) in operation 409, the electronic device (e.g., the electronic device 101 of FIG. 1 or the electronic device 201 of FIG. 2) may compare the voltage of the battery (e.g., the battery 289 of FIG. 2) with a threshold value (e.g., 3.2V) in operation 411.

When the electronic device (e.g., the electronic device 101 of FIG. 1 or the electronic device 201 of FIG. 2) identifies that the voltage of the battery (e.g., the battery 289 of FIG. 2) is less than the threshold value (operation 411—YES) in operation 411, the electronic device (e.g., the electronic device 101 of FIG. 1 or the electronic device 201 of FIG. 2) may decouple the battery (e.g., the battery 289 of FIG. 2) from the main board (e.g., the main board 210 of FIG. 2) on which the components of the electronic device are disposed by opening a switch (e.g., the switch 231 of FIG. 2) coupling the battery (e.g., the battery 289 of FIG. 2) to the main board (e.g., the main board 210) in operation 413.

When the electronic device (e.g., the electronic device 101 of FIG. 1 or the electronic device 201 of FIG. 2) identifies that the voltage of the battery (e.g., the battery 289 of FIG. 2) is equal to or greater than (operation 411—NO) in operation 411, the electronic device (e.g., the electronic device 101 of FIG. 1 or the electronic device 201 of FIG. 2) may power off itself after maintaining the power-on time to be the first time or resetting the power-on time to the second time on, based on the voltage of the battery (e.g., the battery 289 of FIG. 2) in operation 415.

According to an embodiment, when the power-off period of the electronic device is equal to or shorter than the threshold period, and the voltage of the battery is equal to or greater than the threshold value, the electronic device may identify a voltage of the battery and maintain or reset the power-on time to power on the electronic device in the power-off state of the electronic device, based on the identified voltage of the battery.

According to an embodiment, when the identified voltage of the battery falls within the first threshold range, the electronic device may maintain the power-on time to be the first time. When the identified voltage of the battery falls within the second threshold range or the third threshold range, the electronic device may reset the power-on time to the second time or the third time.

According to an embodiment, after transmitting information about the power-on time set to the first time, or information about the power-on time reset to the second time or the third time to a power management module (e.g., the power management module 288 of FIG. 2), the electronic device may power off itself.

Figure 5:
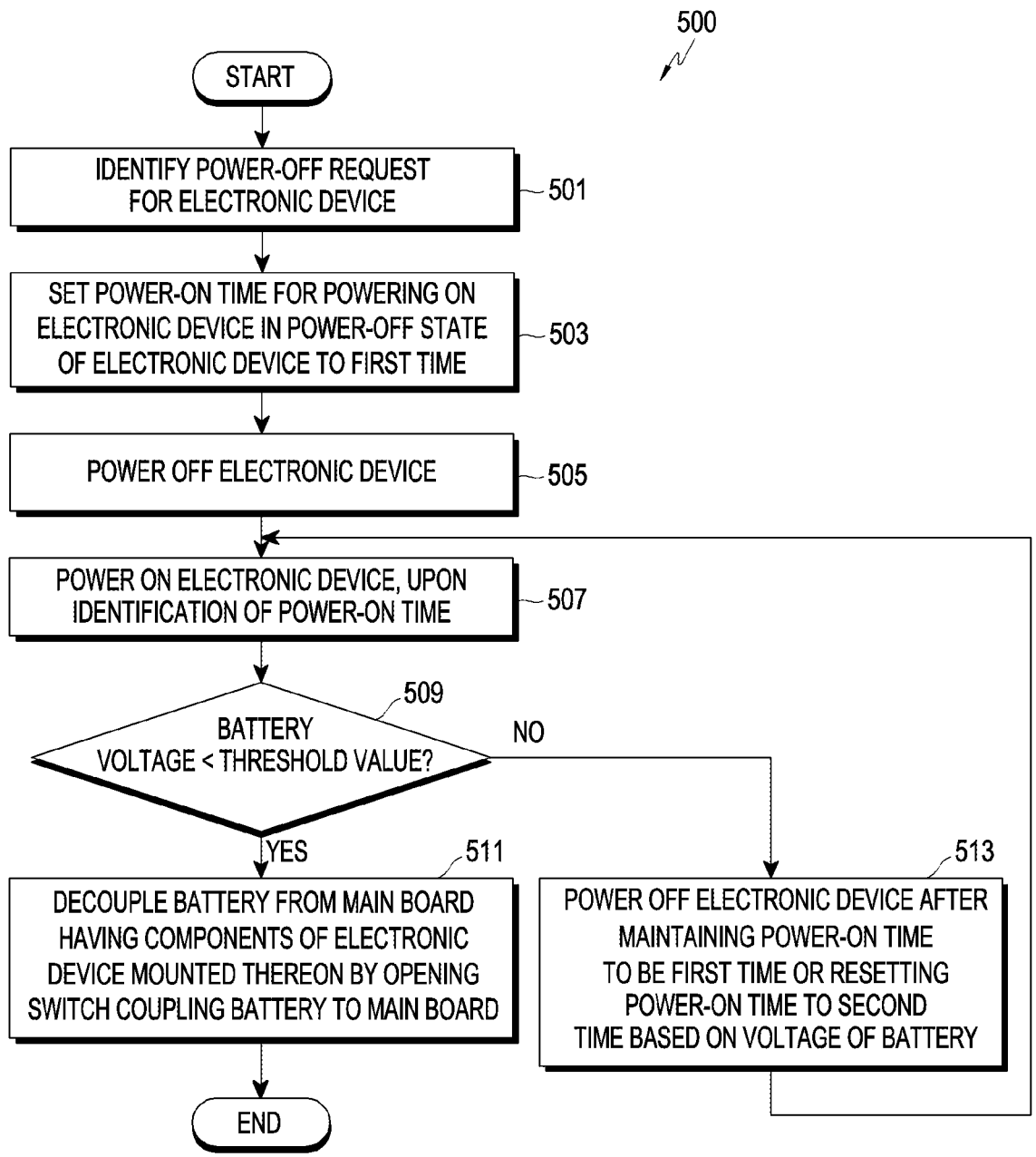
FIG. 5 is a flowchart illustrating an operation of performing a battery protection function in an electronic device according to various embodiments.

FIG. 5 is a flowchart 500 illustrating an example operation of performing a battery protection function in an electronic device according to various embodiments. The operation of performing the battery protection function may include operations 501 to 513. According to an embodiment, at least one of operations 501 to 513 may be skipped, the order of some operations may be changed, or another operation may be added. Operations 501 to 513 may be performed, for example, in an electronic device (e.g., the electronic device 101 of FIG. 1, a component of the electronic device 101 of FIG. 1 (e.g., the processor of FIG. 1), the electronic device 201 of FIG. 2, or a component of the electronic device 201 of FIG. 2 (e.g., the processor 220 of FIG. 2)).

In operation 501, the electronic device (e.g., the electronic device 101 of FIG. 1 or the electronic device 201 of FIG. 2) may identify a power-off request for the electronic device.

According to an embodiment, when identifying a user request or identifying a voltage of a battery (e.g., the battery 289 of FIG. 2) as a power-off voltage of the electronic device, the electronic device may identify the user request or the power-off voltage as the power-off request for the electronic device.

In operation 503, the electronic device (e.g., the electronic device 101 of FIG. 1 or the electronic device 201 of FIG. 2) may set a power-on time to power on the electronic device in a power-off state of the electronic device to a first time.

According to an embodiment, the electronic device may identify a voltage of the battery (e.g., the battery 289 of FIG. 2), and set the power-on time to power on the electronic device in the power-off state of the electronic device, based on the voltage of the battery.

According to an embodiment, the electronic device may identify a voltage of the battery, detect the first time corresponding to the voltage of the battery in memory (e.g., the memory 230 of FIG. 2), and set the detected first time as the power-on time to power on the electronic device in the power-off state of the electronic device. For example, when battery voltage values are divided into a first threshold range, a second threshold range, and a third threshold range in descending order, and the first threshold range, the second threshold range, and the third threshold range are stored mapped to a first time (e.g., one week), a second time (e.g., three days), and a third time (e.g., one day) as a power-on time, respectively in the memory, the electronic device may set the first time as the power-on time, when the voltage of the battery falls within the first threshold range.

According to an embodiment, the electronic device may identify a voltage of the battery, and set the power-on time based on the voltage of the battery and a model type of the electronic device. For example, when battery voltage values are divided into a first threshold range, a second threshold range, and a third threshold range in descending order, and the first threshold range, the second threshold range, and the third threshold range are stored mapped to a first time (e.g., one week), a second time (e.g., three days), and a third time (e.g., one day) as a power-on time, respectively in the memory, the first threshold range, the second threshold range, and the third threshold range may be stored differently depending on the model type of the electronic device.

In operation 505, the electronic device (e.g., the first electronic device 101 of FIG. 1 or the electronic device 201 of FIG. 2) may power itself off.

According to an embodiment, when the power-on time is set to the first time, the electronic device may transmit the set first time as information about the power-on time to a power management module (e.g., the power management module 288) and then power itself off.

In operation 507, upon identification of the power-on time, the electronic device (e.g., the electronic device 101 of FIG. 1 or the electronic device 201 of FIG. 2) may power itself on.

According to an embodiment, in the case where the power-on time is set to the first time, upon receipt of first information indicating power-on of the electronic device by the power management module (e.g., the power management module 288 of FIG. 2) from the power management module which has powered on the electronic device at the first time set as the power-on time from the power management module (e.g., the power management module 288 of FIG. 2), the electronic device may activate and operate only some components required to determine whether to decouple the battery (e.g., the battery 289 of FIG. 2) from a main board (e.g., the main board 210 of FIG. 2) among the components of the electronic device disposed on the main board (e.g., the main board 210 of FIG. 2).

In operation 509, the electronic device (e.g., the electronic device 101 of FIG. 1 or the electronic device 201 of FIG. 2) may compare the voltage of the battery (e.g., the battery 289 of FIG. 2) with a threshold value (e.g., 3.2V).

When the electronic device (e.g., the electronic device 101 of FIG. 1 or the electronic device 201 of FIG. 2) identifies that the voltage of the battery (e.g., the battery 289 of FIG. 2) is less than the threshold value (operation 509—YES) in operation 509, the electronic device (e.g., the electronic device 101 of FIG. 1 or the electronic device 201 of FIG. 2) may decouple the battery (e.g., the battery 289 of FIG. 2) from the main board (e.g., the main board 210 of FIG. 2) on which the components of the electronic device are disposed by opening a switch (e.g., the switch 231 of FIG. 2) coupling the battery (e.g., the battery 289 of FIG. 2) to the main board (e.g., the main board 210) in operation 511.

According to an embodiment, when the voltage of the battery is less than the threshold value as a result of comparing the voltage of the battery with the threshold value, the electronic device may decouple the battery from the main board by opening the switch, thereby cutting off power from the components of the electronic device disposed on the main board, and powering off itself.

According to an embodiment, when the voltage of the battery is less than the threshold as a result of comparing the voltage of the battery with the threshold, the electronic device may open the switch by controlling a protection circuit (e.g., the protection circuit 233 of FIG. 2).

When the electronic device (e.g., the electronic device 101 of FIG. 1 or the electronic device 201 of FIG. 2) identifies that the voltage of the battery (e.g., the battery 289 of FIG. 2) is equal to or greater than the threshold (operation 509—NO) in operation 509, the electronic device (e.g., the electronic device 101 of FIG. 1 or the electronic device 201 of FIG. 2) may power off itself after maintaining the power-on time to be the first time or resetting the power-on time to the second time based on the voltage of the battery (e.g., the battery 289 of FIG. 2) in operation 513.

According to an embodiment, when the voltage of the battery is equal to or greater than the threshold as a result of comparing the voltage of the battery with the threshold, the electronic device may identify a voltage of the battery and maintain or reset the power-on time to power on the electronic device in the power-off state of the electronic device, based on the identified voltage of the battery.

According to an embodiment, when the identified voltage of the battery falls within the first threshold range, the electronic device may maintain the power-on time to be the first time. When the identified voltage of the battery falls within the second threshold range or the third threshold range, the electronic device may reset the power-on time to the second time or the third time.

According to an embodiment, after transmitting information about the power-on time set to the first time, or information about the power-on time reset to the second time or the third time to a power management module (e.g., the power management module 288 of FIG. 2), the electronic device may power off itself.

According to various example embodiments, a method of protecting a battery in an electronic device may include: upon identification of a power-off request for the electronic device, setting a power-on time to power on the electronic device that is in a power-off state, based on the power-on time being set, powering off the electronic device, based on the electronic device being powered on upon identification of the power-on time, comparing a power-off period of the electronic device with a threshold period, and based on the power-off period of the electronic device being longer than a threshold period, decoupling the battery from a main board on which components of the electronic device are disposed by opening a switch coupling the battery to the main board.

According to various example embodiments, the power-on time of the electronic device may include, upon the identification of the power-off request for the electronic device, identifying a voltage of the battery and setting the power-on time to a first time based on the voltage of the battery.

According to various example embodiments, the method may further include powering off the electronic device, after transmitting information about the set power-on time to a power management module of the electronic device.

According to various example embodiments, comparing the power-off period of the electronic device with the threshold period may include comparing the power-off period with the threshold period, upon receipt of first information indicating power-on of the electronic device by the power management module which has powered on the electronic device at the first time set as the power-on time of the electronic device, from the power management module.

According to various example embodiments, the power-off period of the electronic device may be a time period from a time at which the electronic device is initially powered off to a time at which the electronic device is powered on at the power-on time.

According to various example embodiments, the method may further include setting the threshold period based on the voltage of the battery, based on the electronic device being powered on, upon identification of the power-on time.

According to various example embodiments, the method may further include, based on the power-off period of the electronic device being equal to or shorter than the threshold period, maintaining the power-on time to be the first time or resetting the power-on time to a second time based on the voltage of the battery, and based on the power-on time being maintained to be the first time or reset to the second time, powering off the electronic device.

According to various example embodiments, the method may further include, based on the power-off period of the electronic device being equal to or shorter than the threshold period, comparing the voltage of the battery with a threshold value, and based on the voltage of the battery being less than the threshold value, decoupling the battery from the main board by opening the switch.

According to various example embodiments, the method may further include, based on the battery voltage being equal to or greater than the threshold, maintaining the power-on time to be the first time or resetting the power-on time to a second time based on the voltage of the battery, and based on the power-on time being maintained to be the first time or reset to the second time, powering off the electronic device.

According to various example embodiments, the method may further include controlling a protection circuit of the electronic device to open or close the switch.

The electronic device according to various embodiments may be one of various types of electronic devices. The electronic devices may include, for example, a portable communication device (e.g., a smartphone), a computer device, a portable multimedia device, a portable medical device, a camera, a wearable device, a a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a battery;
   a switch coupling the battery to a main board on which components of the electronic device are disposed;
   a power management module comprising power management circuitry including a function of powering on the electronic device at a power-on time set to power on the electronic device that is in a power-off state; and
   a processor,
   wherein the processor is configured to:
   upon identification of a power-off request for the electronic device, set the power-on time and power off the electronic device, and
   based on the electronic device being powered on upon identification of the power-on time, compare a power-off period of the electronic device with a threshold period, and based on the power-off period of the electronic device being longer than a threshold period, decouple the battery from the main board by opening the switch.

2. The electronic device of claim 1, wherein the processor is configured to: upon the identification of the power-off request for the electronic device, identify a voltage of the battery and set the power-on time to a first time based on the voltage of the battery.

3. The electronic device of claim 1, wherein the processor is configured to power off the electronic device, after transmitting information about the set power-on time to the power management module.

4. The electronic device of claim 1, wherein the processor is configured to compare the power-off period with the threshold period upon receipt of first information indicating power-on of the electronic device by the power management module which has powered on the electronic device at the first time set as the power-on time of the electronic device from the power management module.

5. The electronic device of claim 1, wherein the power-off period of the electronic device is a time period from a time at which the electronic device is initially powered off to a time at which the electronic device is powered on at the power-on time.

6. The electronic device of claim 1, wherein the processor is configured to set the threshold period based on the voltage of the battery, based on the electronic device being powered on, upon identification of the power-on time.

7. The electronic device of claim 1, wherein the processor is configured to: power off the electronic device after maintaining the power-on time to be the first time or resetting the power-on time to a second time based on the voltage of the battery, based on the power-off period of the electronic device being equal to or shorter than the threshold period.

8. The electronic device of claim 1, wherein the processor is configured to:
   based on the power-off period of the electronic device being equal to or shorter than the threshold period, compare the voltage of the battery with a threshold value, and
   based on the voltage of the battery being less than the threshold value, decouple the battery from the main board by opening the switch.

9. The electronic device of claim 8, wherein the processor is configured to, based on the battery voltage being equal to or greater than the threshold, power off the electronic device after maintaining the power-on time to be the first time or resetting the power-on time to a second time based on the voltage of the battery.

10. The electronic device of claim 1, further comprising a protection circuit,
    wherein the processor is configured to control the protection circuit to open or close the switch.

11. A method of protecting a battery in an electronic device, the method comprising:
    upon identification of a power-off request for the electronic device, setting a power-on time to power on the electronic device that is in a power-off state
    based on the power-on time being set, powering off the electronic device;
    based on the electronic device being powered on upon identification of the power-on time, comparing a power-off period of the electronic device with a threshold period; and
    based on the power-off period of the electronic device being longer than a threshold period, decoupling the battery from a main board on which components of the electronic device are disposed by opening a switch coupling the battery to the main board.

12. The method of claim 11, wherein setting the power-on time of the electronic device comprises, upon the identification of the power-off request for the electronic device, identifying a voltage of the battery and setting the power-on time to a first time based on the voltage of the battery.

13. The method of claim 11, further comprising powering off the electronic device, after transmitting information about the set power-on time to a power management module of the electronic device.

14. The method of claim 11, wherein comparing the power-off period of the electronic device with the threshold period comprises comparing the power-off period with the threshold period upon receipt of first information indicating power-on of the electronic device by the power management module which has powered on the electronic device at the first time set as the power-on time of the electronic device from the power management module.

15. The method of claim 11, wherein the power-off period of the electronic device is a time period from a time at which the electronic device is initially powered off to a time at which the electronic device is powered on at the power-on time.

16. The method of claim 11, further comprising setting the threshold period based on the voltage of the battery, based on the electronic device being powered on, upon identification of the power-on time.

17. The method of claim 11, further comprising:
    based on the power-off period of the electronic device being equal to or shorter than the threshold period, maintaining the power-on time to be the first time or resetting the power-on time to a second time based on the voltage of the battery; and
    based on the power-on time being maintained to be the first time or reset to the second time, powering off the electronic device.

18. The method of claim 11, further comprising:
    based on the power-off period of the electronic device being equal to or shorter than the threshold period, comparing the voltage of the battery with a threshold value, and
    based on the voltage of the battery being less than the threshold value, decoupling the battery from the main board by opening the switch.

19. The method of claim 18, further comprising:
    based on the battery voltage being equal to or greater than the threshold, maintaining the power-on time to be the first time or resetting the power-on time to a second time based on the voltage of the battery; and based on the power-on time being maintained to be the first time or reset to the second time, powering off the electronic device.

20. The method of claim 11, further comprising controlling a protection circuit of the electronic device to open or close the switch.

* * * * *